(12) United States Patent
Schwartz et al.

(10) Patent No.: US 7,916,933 B2
(45) Date of Patent: Mar. 29, 2011

(54) AUTOMATIC TARGET RECOGNITION SYSTEM FOR DETECTION AND CLASSIFICATION OF OBJECTS IN WATER

(75) Inventors: Steven Allen Schwartz, Melbourne Beach, FL (US); Kenneth J. Wallenstein, West Melbourne, FL (US); David S. Lee, Satellite Beach, FL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1106 days.

(21) Appl. No.: 11/654,886

(22) Filed: Jan. 18, 2007

(65) Prior Publication Data

US 2008/0175434 A1    Jul. 24, 2008

(51) Int. Cl.
*G06K 9/00* (2006.01)

(52) U.S. Cl. ........ 382/154; 382/103; 382/106; 382/181; 345/419; 345/424

(58) Field of Classification Search ................. 382/103, 382/106, 154, 181, 107; 354/419–427
See application file for complete search history.

(56) References Cited

U.S. PATENT DOCUMENTS

| | | | |
|---|---|---|---|
| 4,862,257 A * | 8/1989 | Ulich | ............................. 348/31 |
| 5,231,401 A | 7/1993 | Kaman et al. | |
| 5,243,541 A | 9/1993 | Ulich | |
| 5,270,780 A | 12/1993 | Moran et al. | |
| 5,276,632 A | 1/1994 | Corwin et al. | |
| 5,446,529 A * | 8/1995 | Stettner et al. | .............. 356/4.01 |
| 5,457,639 A | 10/1995 | Ulich et al. | |
| 5,822,047 A | 10/1998 | Contarino et al. | |
| 5,886,661 A | 3/1999 | Harrison et al. | |
| 6,255,980 B1 | 7/2001 | Matthews | |
| 6,466,159 B1 | 10/2002 | Rotgans | |
| 6,664,529 B2 | 12/2003 | Pack et al. | |
| 6,674,895 B2 * | 1/2004 | Rafii et al. | .................... 382/154 |
| 6,836,285 B1 | 12/2004 | Lubard et al. | |
| 6,963,354 B1 | 11/2005 | Scheps | |
| 7,391,907 B1 * | 6/2008 | Venetianer et al. | ........... 382/224 |
| 2004/0252864 A1 * | 12/2004 | Chang et al. | .................. 382/104 |
| 2005/0007448 A1 * | 1/2005 | Kaltenbacher et al. | ........ 348/42 |
| 2005/0099887 A1 * | 5/2005 | Zimmerman et al. | ......... 367/12 |

OTHER PUBLICATIONS

T. J. Desai et al., "Volumetric Signal Processing Hardware Acceleration For Mine Detection", 9 pgs.
G. A. Jarrad et al., "Improving Multispectral Mine Detection Methods By Compensating for Clutter", 4 pgs.
D. W. McMichael, "Data Fusion For Vehicle-Borne Mine Detection", 5 pgs.

* cited by examiner

*Primary Examiner* — Vikkram Bali
*Assistant Examiner* — Daniel Zeilberger
(74) *Attorney, Agent, or Firm* — Robert P. Lenart, Esq.; Pietragallo Gordon Alfano Bosick & Raspanti, LLP

(57) ABSTRACT

A method of detecting objects in water, comprises the steps of capturing a plurality of images of a region of interest, extracting voxel data from the images, and processing the voxel data to detect items of interest in the region of interest. An apparatus that performs the method is also included.

21 Claims, 9 Drawing Sheets

0000000000000000000000000000000000
0000000000000000000000000000000000
0000000000000000000000000000000000
0000000000000000000000000000000000
0000000000000000000000000000000000
0000000000000000000000000000000000
0000000000000111111111110000000000
0000000000000111111111110000000000
0000000000000111111111110000000000
0000000000000111111111110000000000
0000000000000111111111110000000000
0000000000000000000000000000000000
0000000000000000000000000000000000
0000000000000000000000000000000000
0000000000000000000000000000000000
0000000000000000000000000000000000
0000000000000000000000000000000000

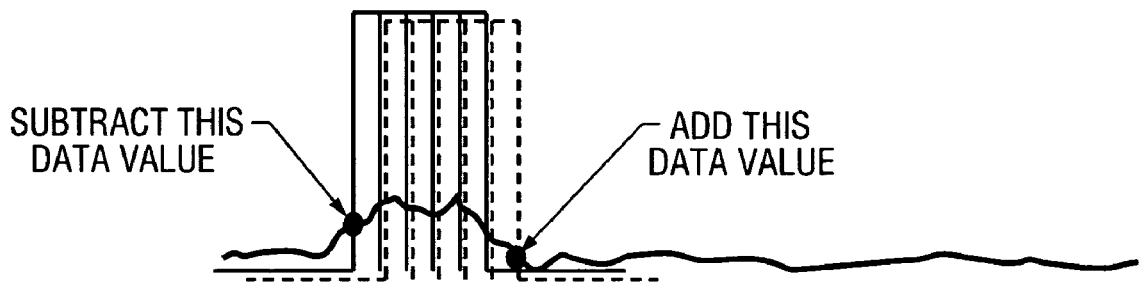
FIG. 8
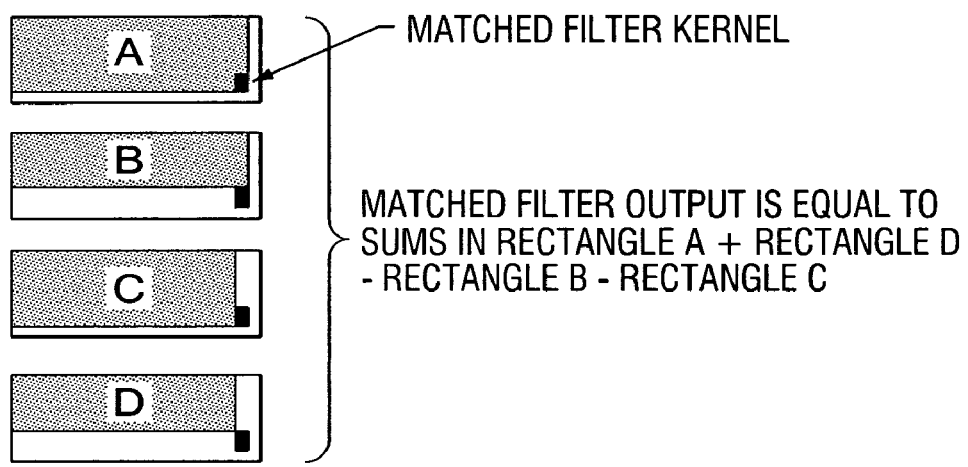
FIG. 9
Mf = 7+5+4+2=18
FIG. 10
FIG. 11

AUTOMATIC TARGET RECOGNITION SYSTEM FOR DETECTION AND CLASSIFICATION OF OBJECTS IN WATER

STATEMENT OF GOVERNMENT INTEREST

This invention was made under Contract No. N61331-00-C-0022. The United States Government has rights in this invention under the contract.

FIELD OF THE INVENTION

This invention relates to methods and apparatus for detecting and classifying objects in water.

BACKGROUND OF THE INVENTION

Various systems have been proposed for locating and identifying water mines. One system for detecting mines is the Northrop Grumman Airborne Laser Mine Detection System (ALMDS) developed and built for the U.S. Navy. The ALMDS system is a laser detection and ranging system (LADAR) system that captures information in the form of a set of images. Each image represents a nearly vertical slice through a volume of water of interest.

The ALMDS system includes a pulsed fan beam laser transmitter, four streak tube receivers, and a data processing unit. Each receiver is composed of a streak tube imager, intensifier and camera to capture the images, and data processing equipment to determine if the volume of water contains a mine. Each receiver records reflected light from approximately one fourth of the transmitted fan beam. All of this hardware is contained in a pod that is typically attached to a helicopter.

This invention seeks to provide an improved data processing algorithm for detecting objects in the ladar images of a volume of water.

SUMMARY OF THE INVENTION

This invention provides a method of detecting objects of a user-selected size in partially transparent material, typically seawater. The method comprises the steps of capturing a plurality of images of a volume of interest, extracting voxel data from the images, and processing the voxel data to detect objects in the volume or floating on the surface of the material in the volume. When the material in the volume is seawater, these detected objects are known to the U.S. Navy as "contacts". The invention further classifies the "contacts" as being either mine-like objects or non-mine-like objects.

BRIEF DESCRIPTION OF THE DRAWINGS

FIG. 8 is a one-dimensional schematic representation of how convolution by the kernel used in the invention is updated.

FIGS. 9, 10 and 11 are numerical diagrams showing how matched filter kernel convolution value is calculated from the summation image.

DETAILED DESCRIPTION OF THE INVENTION

Figure 1:
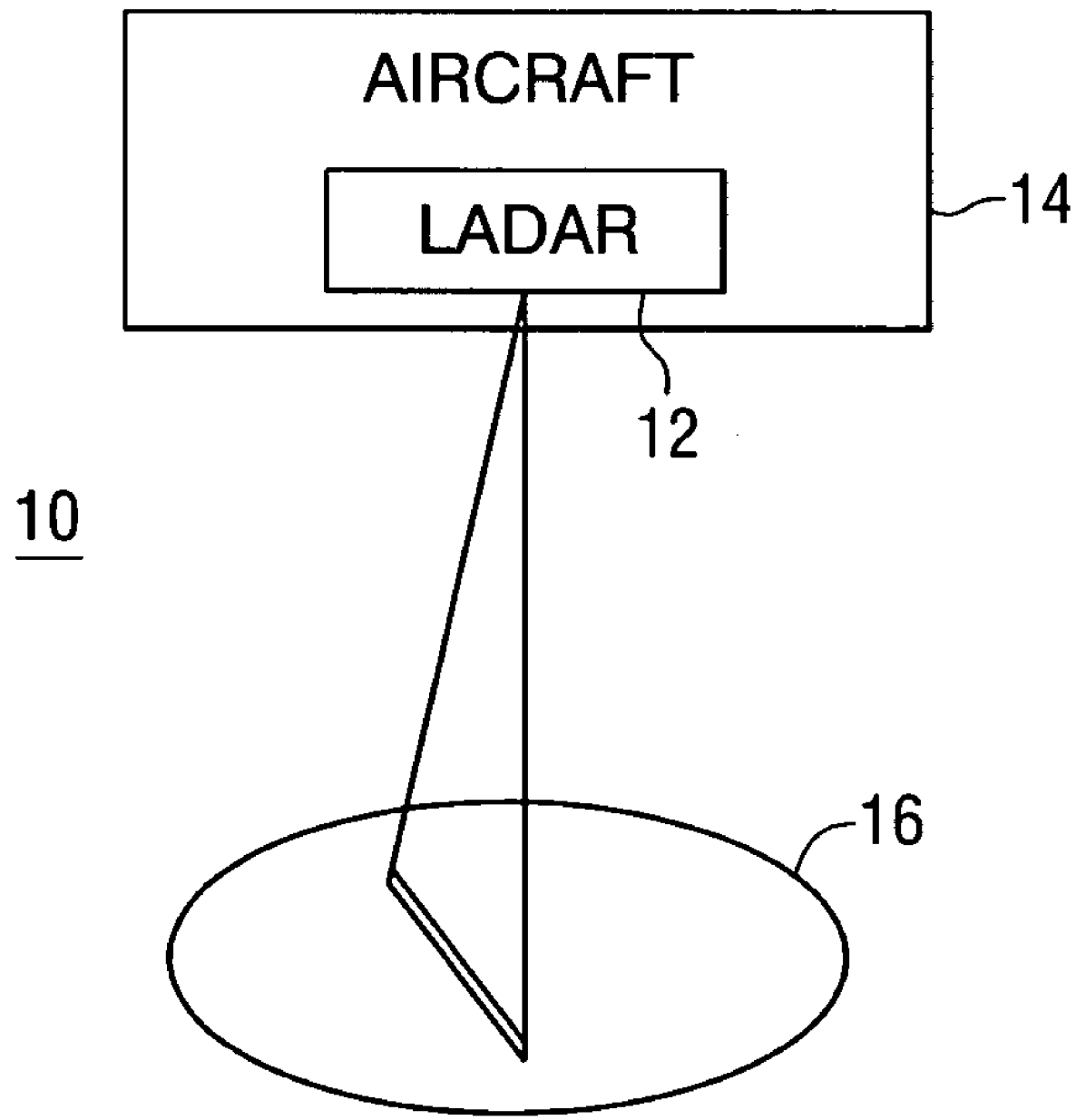
FIG. 1 is a schematic representation of a system constructed in accordance with an embodiment of the invention.

Referring to the drawings, FIG. 1 is a schematic representation of an apparatus 10 that can be constructed and operated in accordance with an embodiment of the invention. The apparatus includes a laser radar (ladar) system 12 mounted on an aircraft 14. A laser in the ladar system emits signals in the form of temporal pulses in a spatial fan beam that are directed towards a region of interest 16. In a particular example, the region of interest can include a body of water.

Figure 2:
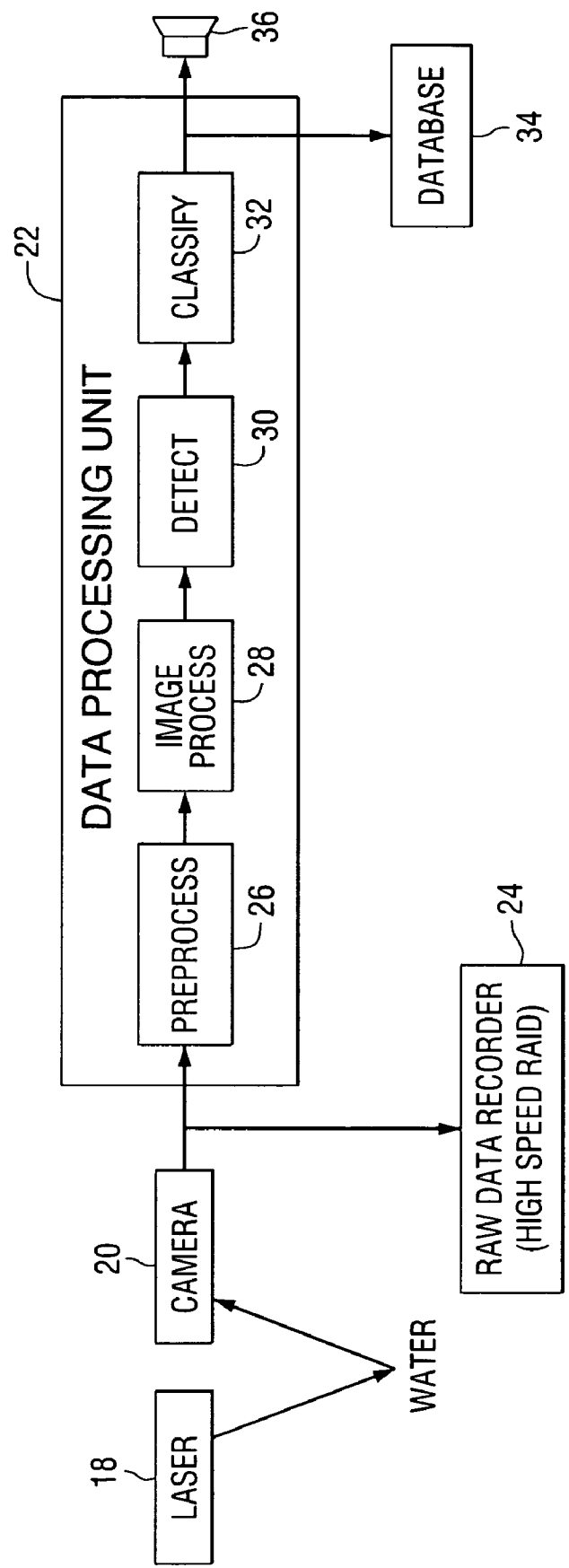
FIG. 2 is a block diagram of a system constructed in accordance with an embodiment of the invention.

FIG. 2 is a block diagram of an apparatus that can be used to practice one embodiment of the method of this invention. The system includes a laser 18 and single or multiple copies of sensors, in the form of one or more cameras 20 that are mounted on the aircraft. The laser illuminates the region of interest with transmitted pulses of light. The transmitted signals are reflected by objects in the region of interest to produce a return signal that is received by the cameras, which produce images of the region of interest in the form of voxels. The voxel data is processed in a pod-mounted signal processing device 22 (also referred to as a data processor) to detect and classify objects in the region of interest. The reflections are received by camera 20 and recorded by a raw data recorder (RDR) 24. The voxel values corresponding to the reflections observed by the camera are preprocessed (26), image processed (28), detected (30) and classified (32) within the data processor. Detected mine-like objects are sent to the database (34) and/or another output device (36). The invention can be implemented using an algorithm contained within the data processor.

As used herein, the "raw data" are the data that leave the camera electronics (20). The raw data represent information relating to a volume of the region of interest. Raw data are collected as follows. In the ALMDS example, the lidar transmits a pulse in the shape of a 60 degree fan beam that is perpendicular to the direction of travel of the lidar platform. The sensor is known as a "pushbroom" sensor. The volume of water is imaged one "slice" at a time. The data representing the water volume is an ordered set of slices. These slices are also called "frames." Except for a small overlap, each camera records the reflections from a particular angular sector of reflections from the transmitted fan beam. Typically the fan beam is about 648 feet across and each camera records the reflections resulting from about 15 degrees, or about 162 feet of the fan beam. In the data processor, these frames will later be summed into groups of eight known as superframes (see FIG. 4).

The native data produced by ALMDS are collected in cylindrical coordinates in which columns correspond to cone angles, rows correspond to slant range (corresponding to a time of flight), and frames correspond to along-track views, or in the language of cylindrical coordinates, angle theta, radius r, and axis z, respectively.

The transmitted pulse is referred to as the transmitted signal, and the received pulse is the received signal. A single transmitted pulse gives rise to many received pulses because the volume elements of the water itself each reflect a small but detectable portion of the transmitted pulse back to the ladar and these may be resolved in time increments. Oftentimes bright flashes from the surface of the water are added to this "volumetric" return, as well as reflections from objects in the water. The transmitted signal passes through a channel that includes: optics, the air, a haze over water in the region of interest, the water's surface, and the water, and then reflects off of a target (if there is one).

As used herein, a "contact" means a detection of something that is neither water, sea bottom, nor wave. A contact may be, for example, a fish, a mine, or floating debris. A "classification" is a declaration that the contact is either a mine-like object (MLO) or a non-mine-like object (NMLO). This terminology is utilized because the primary motivation of the invention is to find mines. However, by changing the shape of the kernel (FIGS. 6 and 7), the invention could be utilized to find objects that have other shapes, i.e. fish-like objects. An "identification" means the determination of the type of mine, which is possible using variants of the existing algorithms to determine shape in more detail.

If a detection is made, the raw data cube of voxels containing the detection, along with some additional information such as its geolocation, and the water attenuation constant are saved along with the data cube in the database 34. Another database, which is referred to as a raw data recorder (RDR) 24 is capable of recording streaming raw images from one or more cameras simultaneously.

In a water-penetrating laser radar (ladar) there are two aspects that complicate the classification of data cubes as being MLO or NMLO for moored mines. The first aspect is the absorption and scattering caused by the water (and other factors); the second aspect is the low level of reflected light from the targets. Attenuation can be so extreme that, combined with the blurring, the received reflection from a mine is not discernable in the image data by the unaided eye although it may be detected by this algorithm. Further improvements can be obtained by means of statistical estimation when the statistical characteristics of the blurring and the detector are known.

Figure 3:
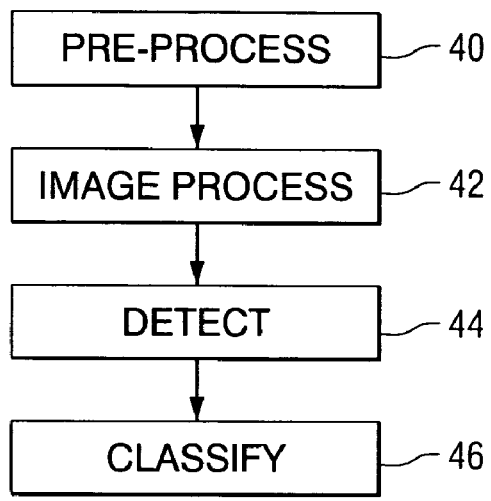
FIG. 3 is a flow diagram that illustrates the method of the invention.

As shown in FIG. 3, in one embodiment, the method of this invention includes four steps: preprocessing 40; image processing 422; detection 44; and classification 46. The preprocessing step is used to reduce data flow and to eliminate receiver artifacts. The image processing step determines the region of interest and removes biases in the data that degrade the performance of the detector. The detection step uses a modified likelihood ratio expression to detect contacts. The classification step computes features, such as texture and size, that are utilized to discriminate mine-like objects (MLOs) or non-mine-like objects (NMLOs).

The automatic target recognition (ATR) herein may be considered to be an alert/confirm sequential detector. A detector makes a decision about each chunk of volume, that is, is it a contact or not? After detection, a second stage classifies the contact as a mine-like object (MLO) or a non-mine-like object (NMLO). The signal processing can be performed using software within the data processing unit in an Airborne Laser Mine Detection System (ALMDS) pod.

The data from each camera are typically displayed as a matrix of pixel values in a matrix view, giving the false impression that the data are expressed in a Cartesian coordinate system. For example, if the ALMDS were to be used in a terrestrial collection, the data is collected in a cylindrical coordinate system. This is also the case when the region of interest is just the ocean surface. Columns correspond directly to cone angle; rows correspond to radial distance from the origin (the sensor); and frames (along-track motion) correspond to movement along the z-axis (the direction of aircraft flight). This is also true for underwater data, except that Snell ray bending at the air-water interface must be taken into account and the time of flight for photons must be interpreted to take into account the velocity of light in water. Thus although the matrix of angle/radius pixels is often presented in a Cartesian arrangement of rows and columns, it isn't really Cartesian at all; and because of Snell's Law bending, it's not exactly a straightforward cylindrical coordinate system either. To present the data in this way (as a matrix in a Cartesian frame) is to distort the image captured by the ladar. In particular the ocean surface, which everyone knows is locally flat on average, appears in the ALMDS data to be curved on average. If the sensor is unpitched, mathematically the surface curve follows a secant relationship with roll angle (or column). Changing the data from its native coordinate system to a Cartesian system is referred to as ortho-rectification. This is not done with underwater data because the distortion is small for objects the size of a mine and ortho-rectification is computationally expensive. If this kind of process were needed, the target templates would be modified to match the distortion of the data, rather than processing all the data.

Figure 4:
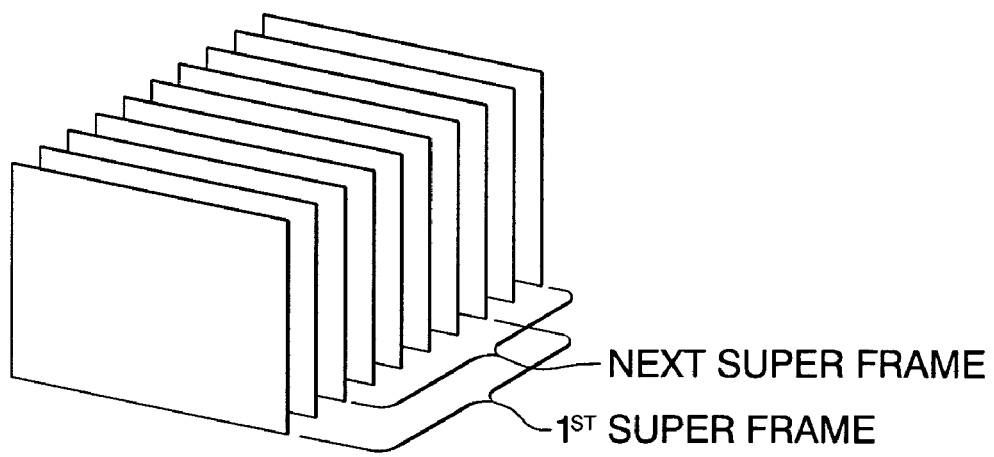
FIG. 4 is a schematic representation of how image frames are combined.

The preprocessing step has two functions: (1) to eliminate receiver artifacts; and (2) to reduce data flow. For example, if there is a vertical column in a camera image that contains only receiver artifacts rather than data, this column can be replaced by an average of the data to the left and right of it. The ladar data are binned by averaging each group of eight consecutive frames into a single superframe (FIG. 4). Thus each pixel in a superframe is the average of eight pixels that have identical row/column indices in the "raw" frames. Each superframe is a two-dimensional object that is sent for image processing and then to a detector. Binning is performed with a stride of two. In other words, each superframe shares six frames in its construction with the previous and next superframes.

As the lidar system flies, frames are collected at a rate of a given number of frames per second. The example of FIG. 4 shows that each superframe is the average of eight raw frames that have been collected sequentially in time. The next superframe shares six frames with the previous superframe. This is similar to constructing a moving average of each pixel. Mathematically the effect of binning is similar to that of non-coherent integration, and similar to convolution with a pulse matched filter in the along-track dimension.

An ALMDS camera frame data is arranged in 512 columns numbered from 0 to 511. The ALMDS receiver has artifacts at the quadrant boundaries, and column 511 of the previous frame is duplicated at column 0 of the current frame. The quadrant boundaries are located at columns 128, 256 and 384. The quadrant boundaries are columns in which there is missing data. Without preprocessing they can affect the performance of the detector. The data in the quadrant boundary columns (128, 256, 384) are replaced by the average of data in columns to either side. The duplication of column 511 (the far right hand column) into column 0 (the far left hand column) is addressed by copying column 511 into column 0. If a different LIDAR were used that had different artifacts or a different data rate or if the data processor had a different computational capacity (in FLOPS), then appropriate changes to this procedure must be made.

The image processing stage includes a step that is similar to ortho-rectification in that it causes the ocean surface to appear flat. The step is known as "unwarping" the frame. To unwarp, one needs to know the cone angle that corresponds to each column of the image. The cone angle is therefore dependent upon the orientation of the platform (for example a helicopter) relative to the earth, and the orientation of the sensor with respect to the platform, as well as the viewing angle within the sensor to which each column in the image corresponds. One may obtain the approximate cone angle of each column from the rule, $$\alpha_{cone}(j) = \cos^{-1}(\cos(\phi_{roll}(j))\cos(\theta_{platpitch})), \quad (1)$$

where $\theta_{platpitch}$ is the platform pitch and $\phi_{roll}$ is the sum of the platform roll and the roll angle that corresponds to a particular column, $$\phi_{roll}(j) = \phi_{platroll} + \phi_{colroll}(j) \quad (2)$$

In the sensor coordinate system (as opposed to the coordinate system of the aircraft), the roll angle that corresponds to a particular column, j, is given by, $$\phi_{colroll}(j) = -0.507891 + \frac{radians}{col}[(512 - 20.48)(N_{camID} - 1) + j + 0.5], \quad (3)$$

where $N_{camID}$ is the camera identification (ID), according to the convention shown in FIG. 8.

The row displacement of the ocean surface (relative to its row index at nadir) is given by, $$\Delta i(j) = \frac{rows}{meter} h\left[\frac{1}{\cos[\alpha_{cone}(j)]} - 1\right], \quad j = 0..511 \quad (4)$$

where h is altitude.

The software takes into account the fact that in one embodiment, the cameras have 20.48 columns of overlap and that the edges of their fields of view are located at roll offsets of 14.1, 0.3, −0.3 and −14.1 degrees.

The problem with using Δi(j) directly is that it is the absolute displacement in rows of the ocean surface from nadir, so this function of j has a constant bias that is equal to the displacement in rows of the ocean surface from nadir to the highest row of the surface in a particular camera.

An outboard camera usually does not include the nadir column. So an outboard camera may have a large constant bias in rows equal to the net extent in rows of the ocean surface across the adjacent inboard camera. To unwarp an image, the column in which the highest row of the ocean surface is found is displaced by zero rows, and any other columns in which the ocean surface is lower are "pulled up" to match the highest row of the ocean surface. The highest row is the one representing lidar reflections that are closest to the LIDAR, or a user's point of view when looking at a graphical viewer. Because the standard mathematical convention for matrix indices is utilized, (0,0) is located to the upper left; that is, lower row indices contain reflections that are closer to the LIDAR.

The range of absolute displacements of the ocean surface for a particular camera is found by exhaustive search in the software. Mathematically it is expressed as, $$\Delta i_{extent} = \Delta i(j_{max}) - \Delta i(j_{min}) \quad (5)$$

where $$j_{min} = \underset{j=0..511}{\operatorname{argmin}} \Delta i(j) \quad (6)$$

$$j_{max} = \underset{j=0..511}{\operatorname{argmax}} \Delta i(j). \quad (7)$$

The actual displacements that are subtracted from the row indices of each column are given by, $$\Delta i(j) \leftarrow \Delta i(j) - \Delta i(j_{min}). \quad (8)$$

Thus column $j_{min}$ in which the ocean surface is highest, is not moved at all. All other pixel values are moved according to the rule, $$\lambda_{ij} \rightarrow \lambda_{i-\Delta i(j),j}, \quad (9)$$

(where $\lambda_{ij}$ is the gray level of the image at row, i, and column, j) which must be iterated with values of i increasing (in order not to overwrite data). This makes the columns appear to be pulled upward in the image and the ocean surface will appear "flattened".

Not all pixels can be moved when the airborne data processor has limited memory hardware. The bottom part of the frame is "cut off" after the unwarp operation. From this point onward the data processor operates on a much smaller frame.

Because the frame has been unwarped, the row containing the ocean surface is easily found as the row of greatest value in a vertical silhouette (projection) of the unwarped frame, $$i_{rowsurface} = \underset{i}{\operatorname{argmax}} \sum_{j=0}^{511} \lambda_{ij}. \quad (10)$$

Equalization is performed by first finding a well-behaved column (WBC) whose index is in the columns within the indices range of 10-501. Columns near the image edges may have artifacts or noisy data. A well-behaved column is one that never has a value greater than 4000 or less than some predetermined minimum value. The first constraint guarantees that the column is unsaturated and the second guarantees that it has at least one pixel that has a realistic surface reflection. Thus a well-behaved column has a good dynamic range without saturating. Because of these nice properties, the well-behaved column is also utilized to compute $k_{lidar}$ (described later).

The model for equalization is that each column follows the same decay curve except for a constant multiplier. The decay curve does not have to be exponential. In fact, it is precisely for this reason that a WBC rather than an exponential curve is utilized. To wit, the model for the value of any pixel (below the surface) is, $$\lambda_{ij} = A_j f(i), \quad (11)$$

where f(i) is the decay curve of the WBC and $A_j$ is the value of the curve at the ocean surface, $A_j = \lambda_{i_{rowsurface},j}$. Let j' be the index of the WBC. The decay curve is formed as, $$f(i) \leftarrow \lambda_{ij'} / \lambda_{i_{rowsurface},j'}. \quad (12)$$

Thus the decay curve is a set of numbers with a maximum of unity (at the surface) and decreasing towards zero as index i increases.

This model is perfect for equalizing the WBC. If this model were perfect for every column, j, then $$\lambda_{ij} / A_j f(i) \quad (13)$$

would always be unity, except for pixels containing targets. This presumes that the WBC does not contain a target. This is of course not quite the case in real life, but it is close enough. Any disturbance in the water or receiver artifact leads to a problem with the equalization. Thus the streak tube blobs or an MLO pixel will not equalize properly. On the whole it helps the detector.

A slight loss in the overall system probability of detection occurs due to the fact that a target occasionally lies in the WBC. This problem may be overcome by testing the WBC to be sure it is clear of targets. There are a number of ways to do this. If a target is determined to be within the WBC, then another column must be chosen to be the WBC.

The above system can be modified as $A_j = \Sigma \lambda_{i,j}$ where the summation is performed in the rows below the surface. Using an average of gray levels in rows below the ocean surface can be more stable than using a single gray level.

The detector operates by computing a statistic in a region (that is about the size of an MLO) of the data and then comparing the statistic to a threshold. If the statistic is greater than the threshold, a target is declared to exist in that region of the data. If not, then no target is declared. This procedure is exhaustively applied to every region of the data in the search for targets. Even when a target is declared, it must still be classified as an MLO or NMLO.

This invention assumes that the data model for a streak tube/CCD camera is reasonably modelled as Poisson. In that case, a target of non-uniform intensity has as its sufficient statistic the weighted sum, $$\ell(\vec{r}) = \sum_{k=1}^{N_T} N_k (\ln \lambda_{s,k} - \ln \lambda_n). \tag{14}$$

If a different data model better applies to the data, the above expression may be replaced if there is sufficient computational capacity.

In order to speed the computations, one designs the detector as if the target has uniform intensity. The above expression then reduces to, $$\ell'(\vec{r}) = \sum_{k=1}^{N_T} N_k. \tag{15}$$

Figure 5:
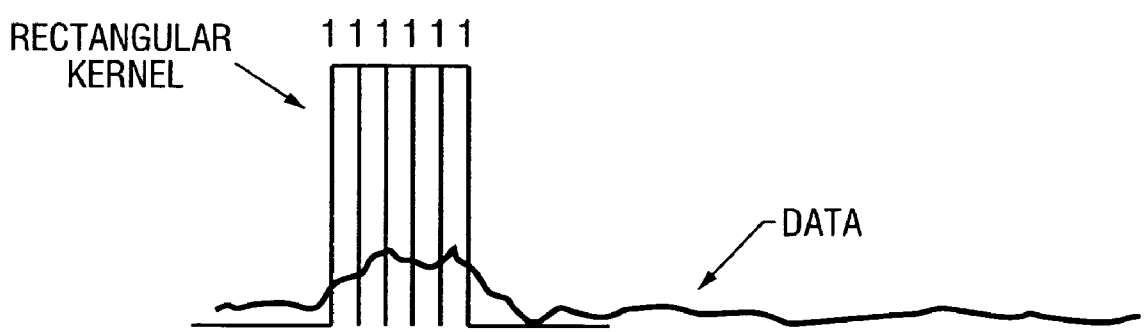
FIG. 5 is a one-dimensional schematic representation of a one-dimensional rectangular kernel applied to one-dimensional example data.

Note that this summation is mathematically equivalent to convolution with a rectangular pulse of unity amplitude. In other words, 'multiply by one and add' is equivalent to 'add'. The sufficient statistic is simply the sum of the pixel values. Performance estimates may be derived analytically from the sufficient statistic and the Poisson probability model. FIG. 5 is a one-dimensional example of the (two-dimensional) detector.

The assumption of uniform intensity means that the detector is a correlation receiver. The receiver compares a normalized version of the input data to a stored rectangular template. This is accomplished by summing point-by-point multiplication of each pixel in a region of the data with the corresponding pixel in the stored template.

The normalized sum is then compared to a threshold. The threshold determines the false alarm rate (FAR) of the "alert" part of the sequential detection. The threshold is set so that the false alarm rate is as low as possible without reducing detection performance below the system requirements.

The stored template for the ALMDS detector is a rectangular region of numbers in the row-column dimensions in one superframe. One may consider the template to be a vector in a multi-dimensional space.

Figures 6, 7:
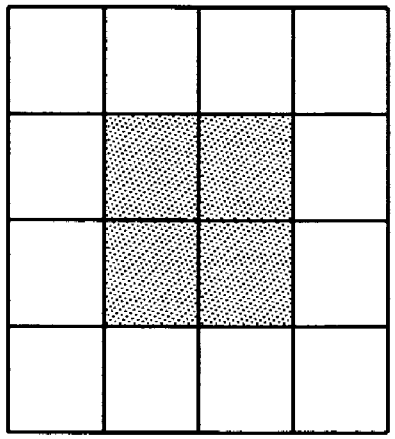
FIGS. 6 and 7 are schematic representations of a two-dimensional kernel.

An over-simplified view of a template, using '1's and '0's, is shown in FIG. 6. FIG. 6 is a simple N×N template of a mine. The shaded pixels correspond to the target ('1's) and the clear pixels correspond to background ('0's). Each box represents one pixel.

FIG. 7 shows a more realistic example template for an operational system. FIG. 7 shows a down-range (rows) vs. cross-track dimension of a rectangular filter. It is a much larger template than the one in FIG. 6, although it is composed of 1's and 0's in order to speed the computation. The template dimensions are input parameters to the software.

As described earlier, the choice of a simple binary template (1's and 0's) allows the computations to be sped up. This is so for two reasons: (1) because the multiply/add that must be performed at each template position is now simply an "add"; and (2) because the sum at the next template position may be found by adding one data value and subtracting another as illustrated in one dimension in FIG. 8. FIG. 8 is a one-dimensional example of computational speed up. After the first summation is completed, each subsequent sum may be found by adding one number and subtracting another.

In two dimensions, this process is implemented as follows. Given the superframe in FIG. 10, a frame of partial sums (FIG. 11) is computed by summing all pixels whose indices are less than or equal to the indices of the pixel in the frame of partial sums. All the adding is done in advance in order to speed up the computation of the convolutions by the rectangular filters. The reason the frame of partial sums is created is that the partial sums may be combined in a simple way that requires only three additions as shown in FIG. 9, wherein the output of a rectangular filter is equal to the sums in (rectangle A+rectangle D) minus (rectangle B+rectangle C).

FIGS. 10 and 11 show an example of the implementation of the computation of a 2×2 rectangular matched filter using the summation image. The sum of the superframe pixel values that are highlighted in FIG. 10 is 18. This same value may be obtained by combining the values from the frame of partial sums in FIG. 11 according to the rule in FIG. 9. Once again the value 18 is obtained.

Figure 12:
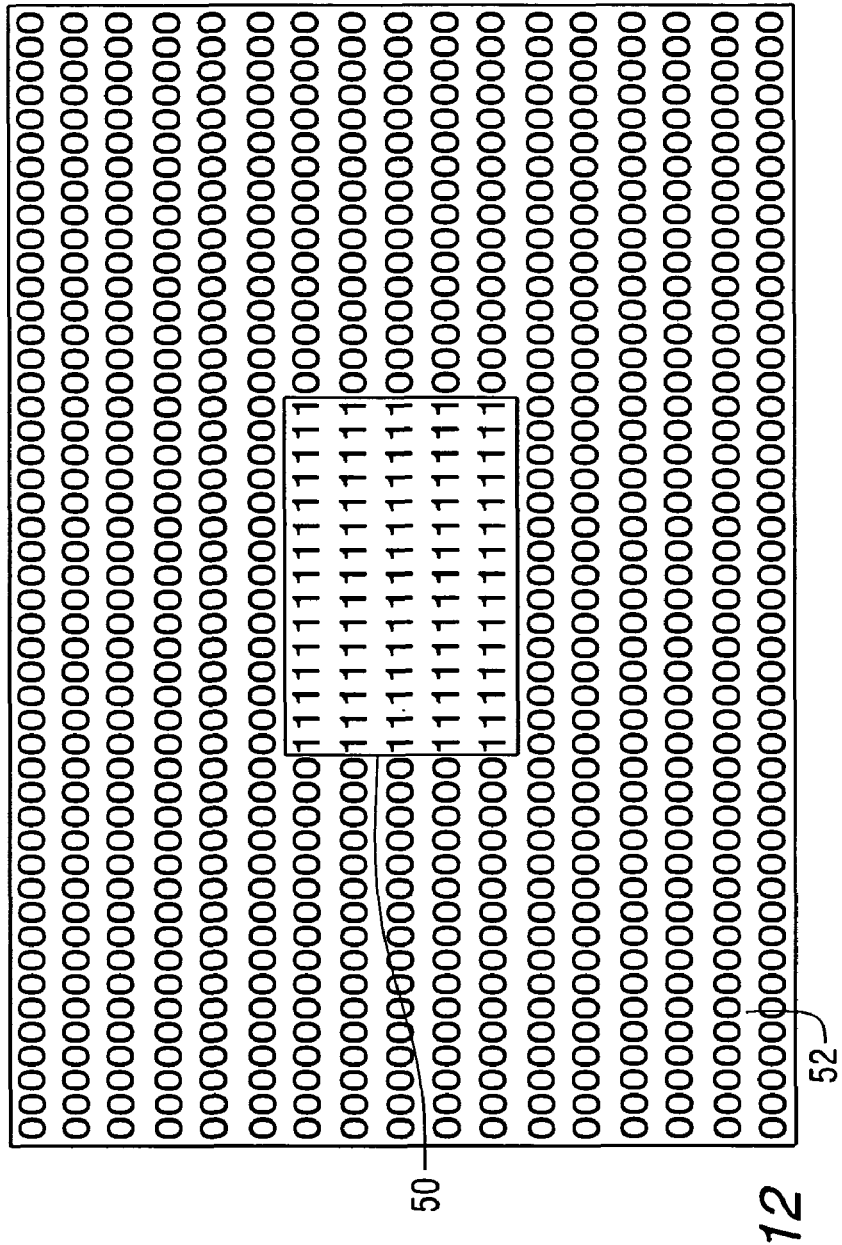
FIG. 12 is a schematic representation of a kernel used for detecting a particular shape of a target in the ALMDS system.

In order to make the detector responsive to signal shape, not signal strength, every region of the image that is sent to the detector is normalized to unit energy. The energy in a region is approximated by the L1 norm, in other words, the sum of the pixel values. This allows the summation image of partial sums to be re-used for computing signal energy, rather than a costly computation of sum of squares. Thus the output of the detector is actually a ratio of two sums. The frame of partial sums is utilized to compute each sum. FIG. 12 shows that the output of the detector is the ratio of the sum of pixel values in the inner rectangle divided by the sum of pixel values in the outer rectangle. In FIG. 12, the inner sum in the small rectangle 50 (the matched filter value) is divided by the outer sum in the large rectangle 52 (the energy in the data).

The threshold has also been generalized in the sense that it is depth dependent. This is accomplished as follows. The outputs of the detector at each depth (row) are utilized to compute a mean and standard deviation of the detector at that depth. The statistical-k of the detector is defined to be the division of (the output of the detector, $x_{ij}$ minus its row mean $\bar{x}_i$) by the standard deviation, $\sigma_i$, at that row, $$k_i = \frac{x_{ij} - \bar{x}_i}{\sigma_i}. \tag{16}$$

It is actually the statistical-k of the detector output that is compared to the threshold. The typical threshold $r_b$ has been determined empirically to be as high as 4.5, to reduce the false alarm rate without reducing the probability of detection very much.

The detector may produce multiple hits (threshold crossings) in the vicinity of each other. Such an event is typical near a target. When that happens, the hit with the greatest statistical-k is retained. A rule is built into the algorithm so that only one target is allowed in each column. This is called a clustering algorithm. This is because it is physically impossible for the ladar to see through targets and each column corresponds exactly to an angular line of sight.

The classifier uses texture, size and aspect ratio to classify targets. The classifiers take as an input a two-dimensional region (known as the "postage stamp") that is constructed from a three-dimensional 50 frame by 50 column by 10 row tensor (known as the contact cube) centered on the contact. The full postage stamp is 50 frames by 50 columns. The postage stamp is constructed by averaging 5 rows in the region around the target.

Texture is computed using a simplified version of Kruger's spatial gray level dependence matrix. The size and aspect ratio are derived from the parameters of a two-dimensional Gaussian intensity surface that is fitted to a two-dimensional projection of the target using the Levenberg-Marquardt algorithm.

Texture is the main feature utilized to distinguish targets from false alarms. The smoother the contact, the more likely the contact is an MLO. In one example, texture is measured on an 11 frame by 11 column region within the postage stamp, consisting of 121 numbers.

The correlation texture classifier is based upon Kruger's spatial gray level dependence matrix, $$C(d, \theta) = \frac{\sum_{i=0}^{K}\sum_{j=0}^{K}(i - \mu_x)(j - \mu_y)S(i, j|d, \theta)}{\sigma_x \sigma_y}, \tag{17}$$

where $S(i, j|d, \theta)$ is the number of times gray level i is oriented with respect to gray level j such that where $\lambda(\bar{x}_a) = i$ and $\lambda(\bar{x}_b) = j$, then $$\bar{x}_b = \bar{x}_a + \begin{pmatrix} d\cos\theta \\ d\sin\theta \end{pmatrix},$$

and, $$\mu_x = \sum_{i=0}^{K} i \sum_{j=0}^{K} S(i, j|d, \theta) \tag{18}$$

$$\mu_y = \sum_{j=0}^{K} j \sum_{i=0}^{K} S(i, j|d, \theta)$$

$$\sigma_x^2 = \sum_{i=0}^{K} (i - \mu_x)^2 \sum_{j=0}^{K} S(i, j|d, \theta) \tag{19}$$

$$\sigma_y^2 = \sum_{j=0}^{K} (j - \mu_x)^2 \sum_{i=0}^{K} S(i, j|d, \theta).$$

The S function is like a joint probability function of gray levels among neighboring pixels (within distance, d). From all this, a single texture number is created by taking an average in all directions, $$S(i, j) = \sum_{\theta=0}^{2\pi} \text{step} \frac{\pi}{8} S(i, j|d, \theta) \bigg|_{d=1}, \tag{20}$$

$$C_{NG} = \frac{\sum_{i=0}^{K}\sum_{j=0}^{K}(i - \mu_x)(j - \mu_y)S(i, j)}{\sigma_x \sigma_y}. \tag{21}$$

If the correlation texture is greater than a depth dependent threshold, then the contact is declared to be an MLO.

Figure 13:
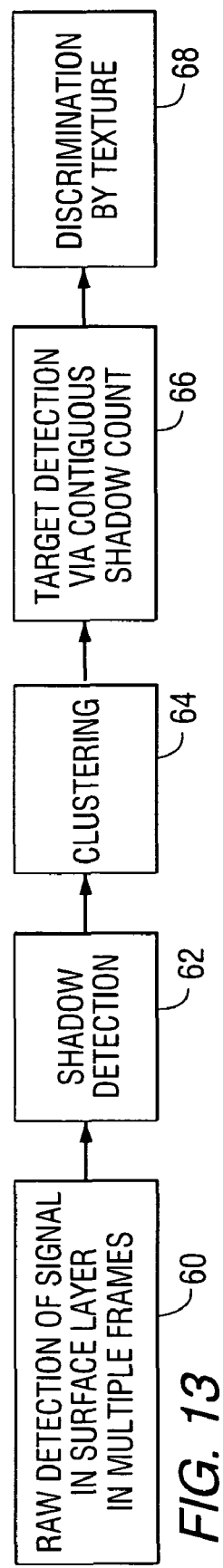
FIG. 13 is a flow diagram that illustrates the method of the surface target detection portion of the invention.

Surface targets go through an additional stage of processing known as coincidence shadow detection (CSD). FIG. 13 is a top level block diagram that describes the essence of the CSD algorithm. The algorithm includes the steps of raw detection of the signal 60, shadow detection 62, clustering 64, target detection 66, and discrimination by texture 68.

For raw detection of the signal, let the surface layer be confined between depths $n_1$ and $n_2$ in pixel units. For a given azimuth m, let $n_1 \leq n_{max}(m) \leq n_2$ be the depth at which the signal is the maximum. This defines the 'surface'.

The 'surface signal' is denoted by $S(m, n_{max}(m), k)$ where k is the frame index. For a given threshold $T_{raw}$, let $\{m_p, p=1, 2, 3 \ldots\}$ be the set of azimuths at which signal peaks above the threshold, that is, $$S(m_p, n_{max}(m_p), k) \geq T_{raw}. \tag{22}$$

The output of this processing is the peak detected depth as a function of the peak detected azimuth.

$$n_{max}(m_p)(p=1, 2, 3, \ldots) \tag{23}$$

In the shadow detection part of the processing, the existence of shadow is examined at the peak azimuths $\{m_p, p=1, 2, 3, \ldots\}$ found in the raw detection stage. For a given $m_p$, the shadow confirmation is performed at the 'shadow depth'

$$n_{shadow} = n_{max}(m_p) + n_{offset}, \tag{24}$$

using $3 \cdot (2\Delta m+1)$ pixels centered about azimuth pixel $m_p$.

Figure 14:
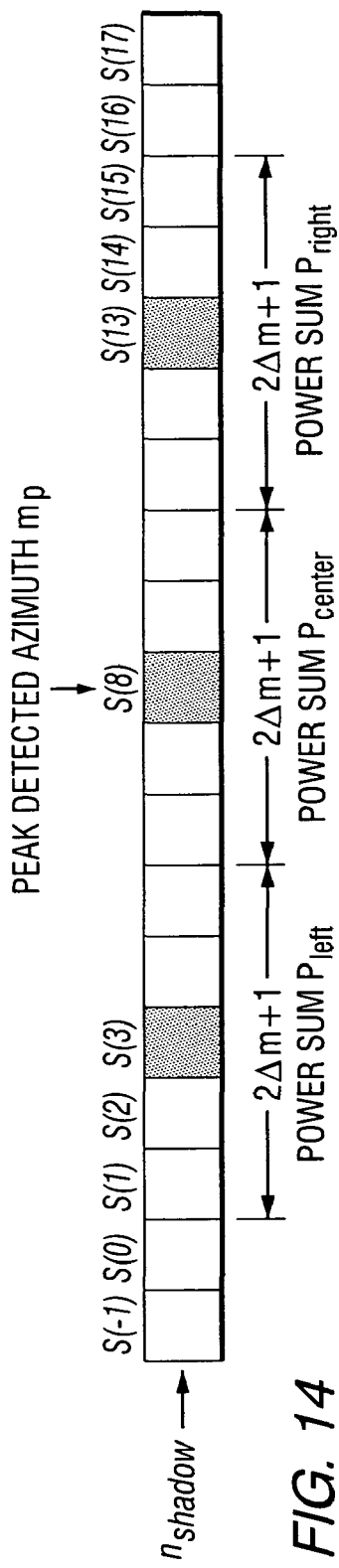
FIG. 14 is a schematic representation of surface target data used in the invention.

FIG. 14 depicts the shadow detection scheme for a $\Delta m=2$ case. The first step in shadow confirmation processing is a low-pass filtering. This can be achieved by convolving the signal with a simple 5-point triangular filter. The filtered $q^{th}$ pixel value is given by $$\bar{S}(q) = S(q-2) + 3S(q-1) + 5S(q) + 3S(q+1) + S(q+2). \tag{25}$$

Let $$P_{left} = \sum_{m=1}^{5} \bar{S}(m), \tag{26}$$

$$P_{center} = \sum_{m=6}^{10} \overline{S}(m) \text{ and}$$

$$P_{right} = \sum_{m=11}^{15} \overline{S}(m)$$

be filtered power sums in three different azimuth sections centered at the $3^{rd}$, $8^{th}$ and $13^{th}$ azimuth pixel at the shadow depth $n_{shadow}$ as depicted in FIG. 14. Note that the data is augmented by two extra pixels at each end, which are reflections of the first and last two pixels. In other words, $$S(-1)=S(2), S(0)=S(1), S(16)=S(15) \text{ and } S(17)=S(14). \quad (27)$$

A shadow is declared if $$P_{center} < P_{left} \text{ and } P_{center} < P_{high} \quad (28)$$

This process is repeated at N different depths starting from $n_{offset}$. Then M out of N shadow detection criteria is imposed to determine whether the peak signal under interrogation has a shadow or not.

For clustering and coincidence shadow detection, the output of the shadow detection processing is a data cube, and the set of shadow-detected positions in three dimensions is ($m_s$, $n_s$, k). Since in this example we are dealing strictly with surface targets, this data cube is collapsed in the depth dimension and the clustering is done in azimuth only. This procedure is not valid if subsurface target detection is of interest. The result is a data sheet, that is, a two-dimensional array ($m_s$, k) of shadow detected locations in azimuth and the along-track dimension.

Figure 15:
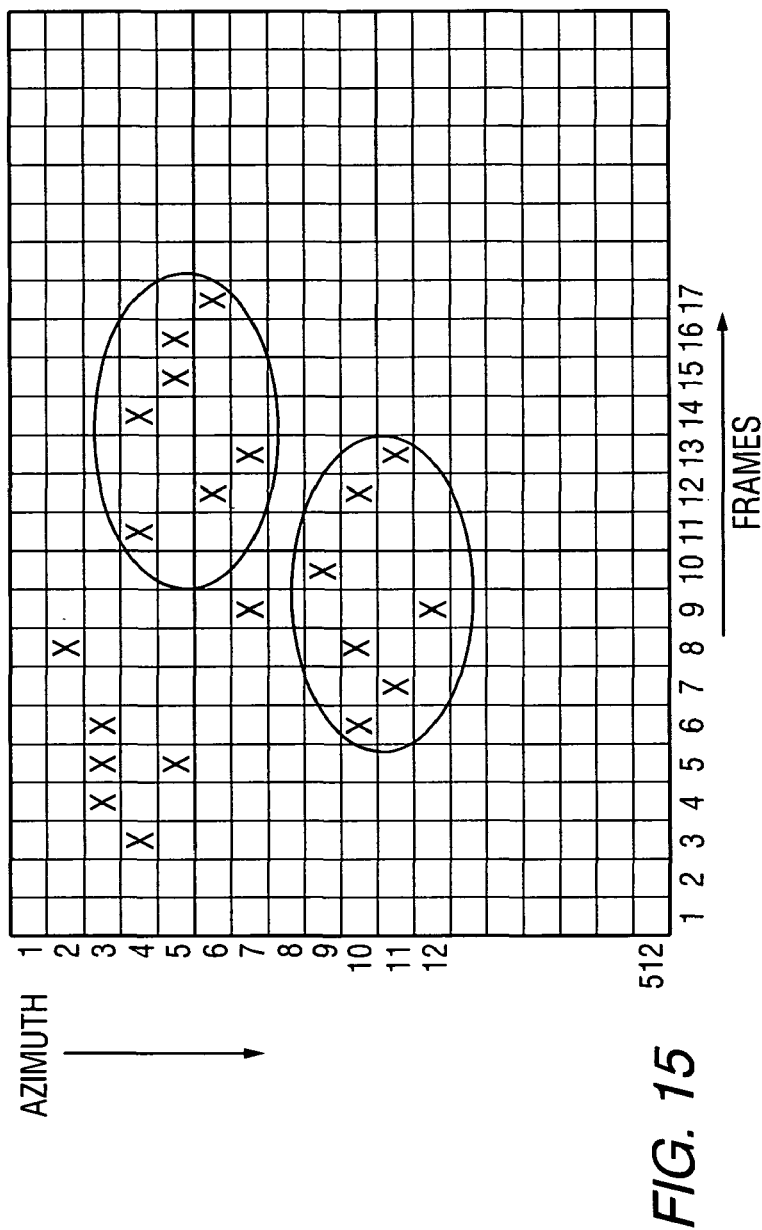
FIGS. 15, 16 and 17 are schematic representations of example surface target data across multiple image frames.

Let $m_w$ be the size of the azimuth 'clustering window'. As the precursor to the coincidence shadow detection, the data within the window is collapsed in the azimuth dimension. Graphically, the cluster processing proceeds as shown in FIG. 15.

Figure 16:
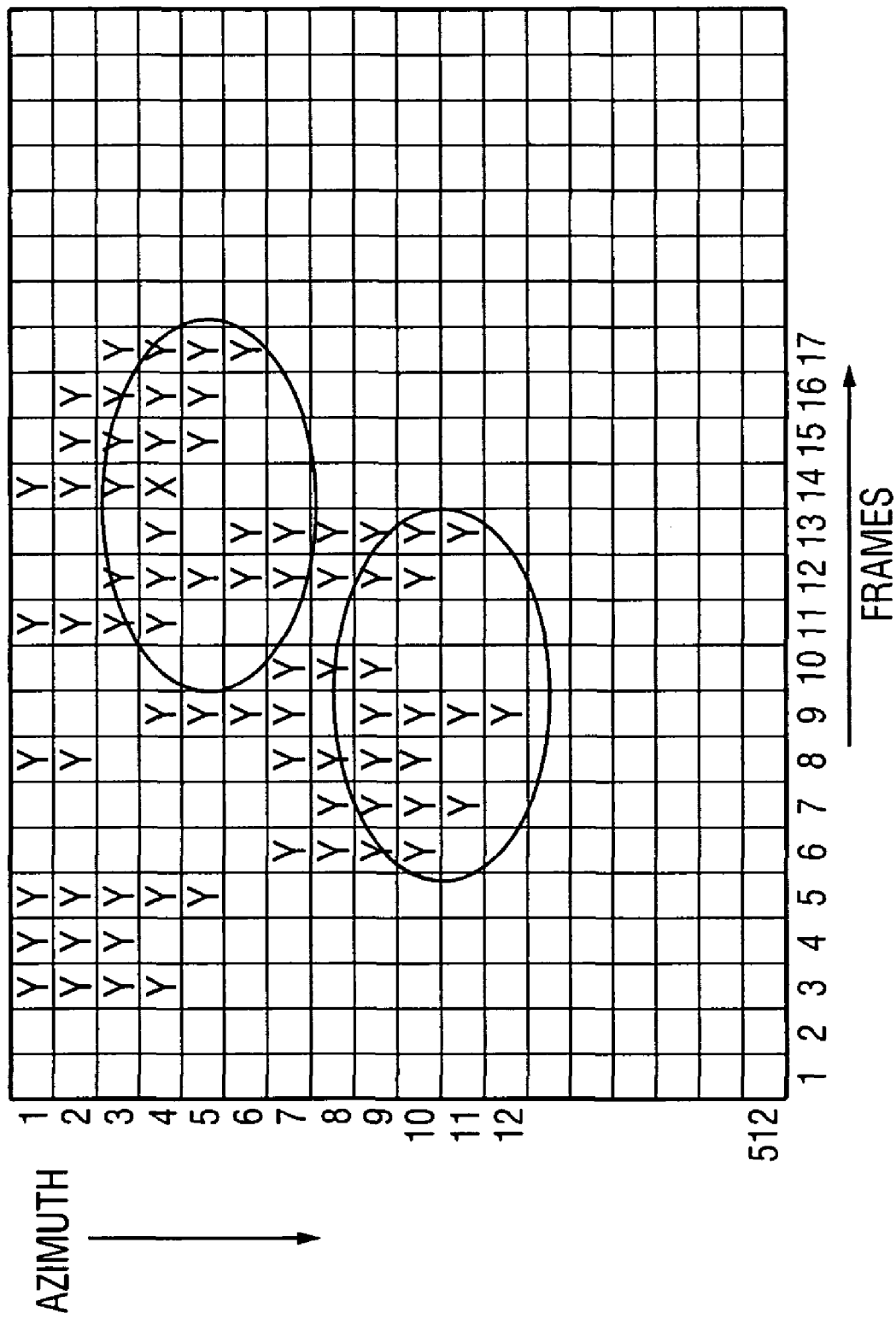
Figure 17:
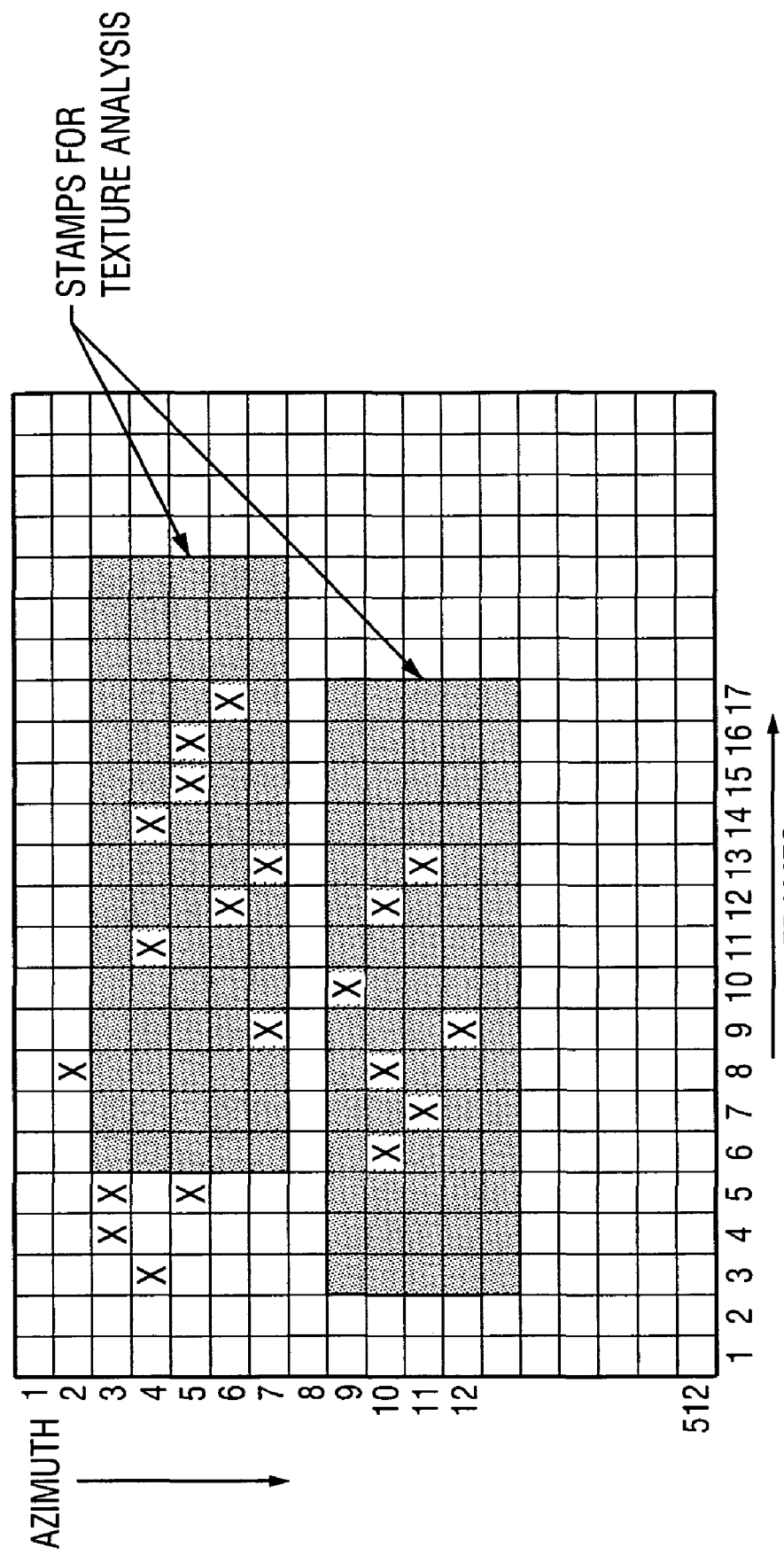

FIG. 16 illustrates the result of 'sliding window' clustering (with unity stride). In FIG. 16, the $M^{th}$ row represents the projection of detections that occur within the clustering window that extends from the $M^{th}$ azimuth to $(M+m_w-1)^{th}$ azimuth.

In one embodiment, the detection criteria is either a minimum of 5 contiguous shadows, or a minimum of 6 out of 7 shadows (will admit 7 out of 8, 8 out of 9, so on). Two detections are considered separate in the along-track dimension if there are two or more consecutive missing shadows between them.

For a group of shadow detections that meet this criteria, the azimuth and the frame of the detected object is determined by the mean of the azimuths and frame numbers of detections within the group.

Discrimination can be performed using a scintillation count. The temporal variation of the target signal is examined at the center azimuth of the target. If more than a certain number of scintillations occur, the contact is not considered to be a MLO. What constitutes a scintillation and threshold number of scintillations for making this declaration is determined empirically.

When the model of exponential decay is assumed, the variable, $k_{lidar}$, is the extinction coefficient of the lidar echo from water. The derivation of the $k_{lidar}$-estimation algorithm begins with the observation that the volumetric return has an intensity proportional to the round-trip attenuation in water.

The measured return, f(z), is, $$f(z) = Ge^{-2k_{lidar}z}, \quad (29)$$

where G is a constant including all receiver parameters and water reflectivity. One may form the ratio, $$\frac{f(z_1)}{f(z_2)} = \frac{Ge^{-2k_{lidar}z_1}}{Ge^{-2k_{lidar}z_2}}. \quad (30)$$

Then, $$\frac{f(z_1)}{f(z_2)} = e^{-2k_{lidar}(z_1-z_2)}, \quad (31)$$

and, $$k_{lidar} = \frac{\ln\frac{f_1}{f_2}}{2(z_2-z_1)}, \quad (32)$$

where $f_k=f(z_k)$ to simplify the notation for the measurements. If the two depths, $z_1$ and $z_2$ are adjacent rows separated by $\Delta z$ then, $$k_{lidar} = \frac{\ln\frac{f_1}{f_2}}{2\Delta z}. \quad (33)$$

Also note that $$f(z+\Delta z) = Ge^{-2k_{lidar}(z+\Delta z)}, \quad (34)$$

so, $$\frac{f(z)}{f(z+\Delta z)} = \frac{Ge^{-2k_{lidar}(z)}}{Ge^{-2k_{lidar}(z+\Delta z)}} = e^{2k_{lidar}\Delta z}. \quad (35)$$

In terms of the other notation, then $$\frac{f_k}{f_{k+1}} = e^{2k_{lidar}\Delta z} = const, \quad (36)$$

that is, the ratio of the volumetric returns of two adjacent rows is ideally a constant. Several ratios are averaged in order to produce a more stable estimate. Operationally, in the software, four rows are averaged because these rows have the greatest number of significant digits, $$k_{lidar} = \frac{1}{2\Delta z}\ln\frac{1}{4}\sum_{k=1}^{4}\frac{f_k}{f_{k+1}}. \quad (37)$$

The system effectiveness index (SEI) is calculated based upon the estimated k value ($k_{est}$) for the water volume being searched (calculated during a mission) and a full performance depth product (k'z') input during data initialization.

The SEI is calculated as: SEI=(k'z')/$k_{est}$. The system also calculates a default value for a full performance depth product.

So, $$SEI = \frac{K'_d z'}{K_d}, \quad (38)$$

where $K_d$ is the measured value of diffuse attenuation, $K'_d$ is the predicted value of diffuse attenuation at the time the mission is planned, and $z'$ is the specification search depth. For example, $K'_d$ might be the value of diffuse attenuation for that part of the ocean that is obtained from a table in an optical oceanography textbook, or from the Navy MEDAL system.

SEI measures distance. The $SEI_{PIDS}$ is developed as follows. The ATR Pd and FAR performance at a specified depth $z'$ is determined by the product, $K'_d z'$, where $K'_d$ is the predicted diffuse attenuation.

If the measured value of diffuse attenuation, $K_d$, differs from the prediction, the same performance is achieved at a new depth, z, so long as the attenuation product is held constant, that is, $$K_d z = K'_d z'. \quad (39)$$

Thus the new depth at which the identical Pd and FAR performance is achieved is, $$SEI_{PIDS} = \frac{K'_d z'}{K_d}. \quad (40)$$

Thus the system effectiveness is the actual, absolute depth at which identical performance is achieved as was predicted at specified depth, $z'$, with the predicted diffuse attenuation, $K'_d$.

While the invention has been described in terms of several embodiments, it will be apparent to those skilled in the art that various changes can be made to the described embodiments without departing from the scope of the invention as set forth in the following claims.

What is claimed is:

1. A method of detecting objects within or floating upon an optically transmissive medium, the method comprising the steps of:
    capturing a plurality of images of a region of interest;
    extracting voxel data from the images;
    processing the voxel data to detect and classify items of interest in the region of interest;
    unwarping a surface of the transmissive medium; and
    performing depth dependent intensity equalization using an adaptive decay model based upon a typical column.

2. The method of claim 1, further comprising the step of: unwarping the voxel data.

3. The method of claim 1, wherein the step of capturing a plurality of images of a region of interest comprises the steps of:
    propagating a transmitted beam from a ladar transmitter to a voxel of interest; and
    propagating a reflected beam from the voxel of interest to a ladar receiver.

4. The method of claim 1, further comprising the step of: preprocessing the voxel data to remove system induced artifacts.

5. The method of claim 1, wherein the step of extracting voxel data from the images comprises the step of:
    averaging a group of consecutive image frames into a superframe.

6. The method of claim 5, wherein each superframe shares a plurality of image frames from a previous and subsequent superframe.

7. The method of claim 1, wherein a measure of water turbidity known as the extinction coefficient, $k_{lidar}$ is estimated from the typical column.

8. The method of claim 1, wherein the step of processing the voxel data to detect items of interest in the region of interest comprises the step of:
    comparing a normalized submatrix of the voxel data to a stored template.

9. The method of claim 1, wherein the step of classifying the items of interest uses texture, size and aspect ratio to classify targets.

10. The method of claim 1, wherein surface items of interest are subjected to coincidence shadow detection.

11. The method of claim 1, further comprising the step of: clustering items of interest in the region of interest.

12. A method of detecting objects within or floating upon an optically transmissive medium, the method comprising the steps of:
    capturing a plurality of images of a region of interest;
    extracting voxel data from the images; and
    processing the voxel data to detect and classify items of interest in the region of interest by comparing a normalized submatrix of the voxel data to a stored template;
    wherein the step of comparing a normalized submatrix of the voxel data with a stored template comprises the steps of:
        summing point-by-point multiplication of each pixel in the voxel data with a corresponding pixel in the stored template to produce a sum;
        normalizing the sum; and
        comparing the sum to a threshold.

13. The method of claim 12, wherein a matrix of partial sums is utilized to speed up the computation of the comparison of the normalized submatrix of voxel data with the stored template.

14. The method of claim 12, wherein the threshold is depth dependent.

15. A method of detecting objects within or floating upon an optically transmissive medium, the method comprising the steps of:
    capturing a plurality of images of a region of interest;
    extracting voxel data from the images;
    processing the voxel data to detect and classify items of interest in the region of interest; and
    clustering items of interest in the region of interest;
    wherein for surface items of interest, the voxel data is collapsed in a depth dimension and clustering is done in azimuth only.

16. An apparatus comprising:
    a plurality of sensors for capturing a plurality of images of a region of interest; and
    a processor for extracting voxel data from the images and processing the voxel data to detect items of interest in the region of interest, wherein the processor classifies items of interest in the region of interest, unwarps a surface of the transmissive medium, and performs depth dependent intensity equalization using an adaptive decay model based upon a typical column.

17. The apparatus of claim 16, wherein the processor: unwarps the voxel data.

18. The apparatus of claim 16, wherein the processor: averages a group of consecutive image frames into a superframe.

19. The apparatus of claim 18, wherein each superframe shares a plurality of image frames from a previous and subsequent superframe.

20. The apparatus of claim 16, wherein the processor: preprocesses the voxel data to remove system induced artifacts.

21. The apparatus of claim 16, wherein the processor: compares a normalized submatrix of the voxel data to a stored template.

* * * * *

UNITED STATES PATENT AND TRADEMARK OFFICE
CERTIFICATE OF CORRECTION

PATENT NO. : 7,916,933 B2
APPLICATION NO. : 11/654886
DATED : March 29, 2011
INVENTOR(S) : Steven A. Schwartz et al.

It is certified that error appears in the above-identified patent and that said Letters Patent is hereby corrected as shown below:

Column 5, Line 67

$\Lambda i_{extent} = \Lambda i(j_{max}) - \Lambda i(j_{min})$ should read $\Delta i_{extent} = \Delta i(j_{max}) - \Delta i(j_{min})$ Column 6, Line 60

$f(i) \leftarrow \lambda_{ij'}/\lambda i_{rowsurfacej'}.$ should read $f(i) \leftarrow \lambda_{ij'}/\lambda i_{rowsurfacej}.$ Column 9, Line 45

$$C(d,\theta) = \frac{\sum_{i=0}^{K}\sum_{j=0}^{K}(i-\mu_x)(j-\mu_y)S(i,i|d,\theta)}{\sigma_x \sigma_y}$$

should read $$C(d,\theta) = \frac{\sum_{i=0}^{K}\sum_{j=0}^{K}(i-\mu_x)(j-\mu_y)S(i,j|d,\theta)}{\sigma_x \sigma_y}$$

Column 9, Line 54
Should read
$$\vec{x}_b = \vec{x}_a + \begin{pmatrix} d\cos\theta \\ d\sin\theta \end{pmatrix}$$
The lines above the "x"'s are arrows.

Signed and Sealed this
Eighteenth Day of September, 2012

David J. Kappos
*Director of the United States Patent and Trademark Office*

CERTIFICATE OF CORRECTION (continued)
U.S. Pat. No. 7,916,933 B2

Column 9, Line 65

$$\mu_y = \sum_{i=0}^{K} j \sum_{j=0}^{K} S(i,j|d,\theta)$$ should read $$\mu_{y'} = \sum_{i=0}^{K} j \sum_{j=0}^{K} S(i,j|d,\theta)$$

Column 10, Line 54
Δm-2   should read   Δm=2

Column 11, Line 19
$P_{center} < P_{left}$ and $P_{center} < P_{high}$   should read   $P_{center} < P_{left}$ and $P_{center} < P_{right}$